(12) United States Patent
Aerrabotu et al.

(10) Patent No.: US 7,263,085 B2
(45) Date of Patent: Aug. 28, 2007

(54) APPARATUS AND METHOD FOR CONTROLLING CONNECTION STATUS

(75) Inventors: Naveen Aerrabotu, Gurnee, IL (US); Robert L. Albrecht, Rolling Meadows, IL (US); Scott T. Droste, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 133 days.

(21) Appl. No.: 10/747,792

(22) Filed: Dec. 29, 2003

(65) Prior Publication Data

US 2005/0141462 A1 Jun. 30, 2005

(51) Int. Cl.
*H04B 7/216* (2006.01)
(52) U.S. Cl. .................. 370/335; 455/518; 370/260
(58) Field of Classification Search ........ 370/260–269; 379/207.01, 202.01; 455/518–520, 462–463
See application file for complete search history.

(56) References Cited

U.S. PATENT DOCUMENTS

| | | | |
|---|---|---|---|
| 6,018,570 A * | 1/2000 | Matison ................. | 379/207.15 |
| 6,112,084 A * | 8/2000 | Sicher et al. ............... | 370/337 |
| 6,198,945 B1 * | 3/2001 | Chen et al. .................. | 455/560 |
| 6,535,730 B1 * | 3/2003 | Chow et al. ................ | 455/416 |
| 6,577,721 B1 * | 6/2003 | Vainio et al. .......... | 379/202.01 |
| 6,788,953 B1 * | 9/2004 | Cheah et al. ............ | 455/550.1 |
| 6,853,718 B1 * | 2/2005 | Bedingfield et al. ... | 379/212.01 |

* cited by examiner

*Primary Examiner*—Chi Pham
*Assistant Examiner*—Thai Hoang
(74) *Attorney, Agent, or Firm*—Matthew C. Loppnow; Gary J. Cunningham

(57) ABSTRACT

An apparatus and method of controlling connection status using a flash with information message. A connection can be established between a communication device and a first party. An operation can trigger an event. A flash with information message can be transmitted on a link signaling channel in response to the event. The flash with information message can include a connection control information record that controls a connection status of the connected first party.

36 Claims, 6 Drawing Sheets

APPARATUS AND METHOD FOR CONTROLLING CONNECTION STATUS

BACKGROUND

1. Field

The present disclosure is directed to a method and apparatus for controlling connection status. More particularly, the present disclosure is directed to controlling a connection status of a communication device using a flash with information message.

2. Description of Related Art

Presently, communication device users can communicate with other parties using a variety of connection techniques. For example, a user can engage in call waiting by making a first party wait while the user is communicating with a second party. The user can also engage in three-way calling by communicating with two parties at the same time. Unfortunately, when switching between parties multiple times, the user may lose track of the connection status of each party. For example, the user may lose track of the party currently being addressed. Also, the user cannot selectively end a call with one party while maintaining a call with another party in three-way calling. For example, to end a call with an undesired party in three-way calling, the undesired party must hang up. If the undesired party does not hang up, the user is forced to end the entire call with both parties and then call back the desired party. Furthermore, present communication systems do not provide for proper signaling to adequately control these connection techniques.

Thus, there is a need for a method and apparatus for controlling connection status for a communication device.

BRIEF DESCRIPTION OF THE DRAWINGS

The embodiments of the present invention will be described with reference to the following figures, wherein like numerals designate like elements, and wherein.

DETAILED DESCRIPTION

The disclosure provides an apparatus and method of controlling connection status of a communication device using a flash with information message. According to one embodiment, a connection can be established between a communication device and a first party. An operation, such as a user action to put a call on hold or selective call termination, can trigger an event. A flash with information message can be transmitted on a link signaling channel in response to the event. The flash with information message can include a connection control information record that controls a connection status of the connected first party.

Figure 1:
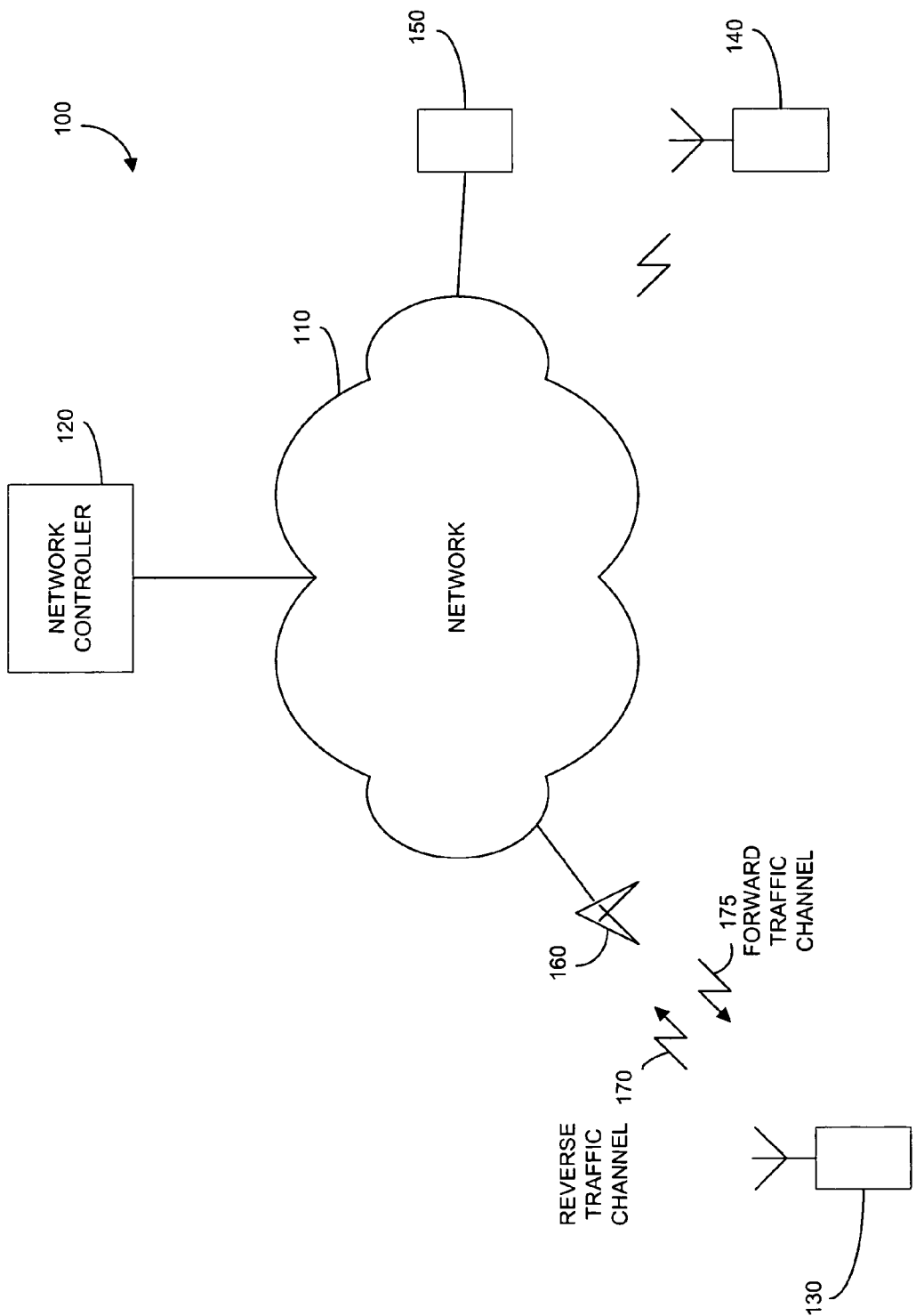
FIG. 1 is an exemplary block diagram of a system according to an example embodiment.

FIG. 1 is an exemplary block diagram of a system 100 according to an example embodiment. The system 100 can include a network 110, a network controller 120, one or more communication devices 130, 140 and 150, and a base station 160. Communication devices 130, 140 and 150 may include telephones, wireless telephones, cellular telephones, personal digital assistants, pagers, personal computers, mobile communication devices, or any other device that is capable of sending and receiving communication signals on a network including wireless network.

In an exemplary embodiment, the network controller 120 is connected to the network 110. The controller 120 may be located at a base station, at a radio network controller, or anywhere else on the network 110. The network 110 may include any type of network that is capable of sending and receiving signals, such as wireless signals. For example, the network 110 may include a wireless telecommunications network, a cellular telephone network, a satellite communications network, and other like communications systems capable of sending and receiving wireless messaging service messages. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

The system 100 can include a forward link signaling channel, such as a forward traffic channel 175, running from the base station 160 to the communication device 130. The forward traffic channel 175 can be used for transmitting messages, data, and the like from the network 110 to the communication device 130. For example, the forward channel 175 can be used for speech transmission, flash with information messages, or the like. The system 100 can also include a reverse link signaling channel, such as a reverse traffic channel 170 or a reverse dedicated signaling channel, running from the communication device 130 to the base station 160. The reverse traffic channel 170 can be used for transmitting messages, data, and the like from the communication device 130 to the network 110. For example, a reverse dedicated signaling channel can be a communication path that exists between a specific communication device, such as the communication device 130, and the base station 160 for the exchange of control information from the specific communication device 130 to the base station 160. The system 100 can also include forward and reverse control channels used for other control information messages, and other useful channels.

Figure 2:
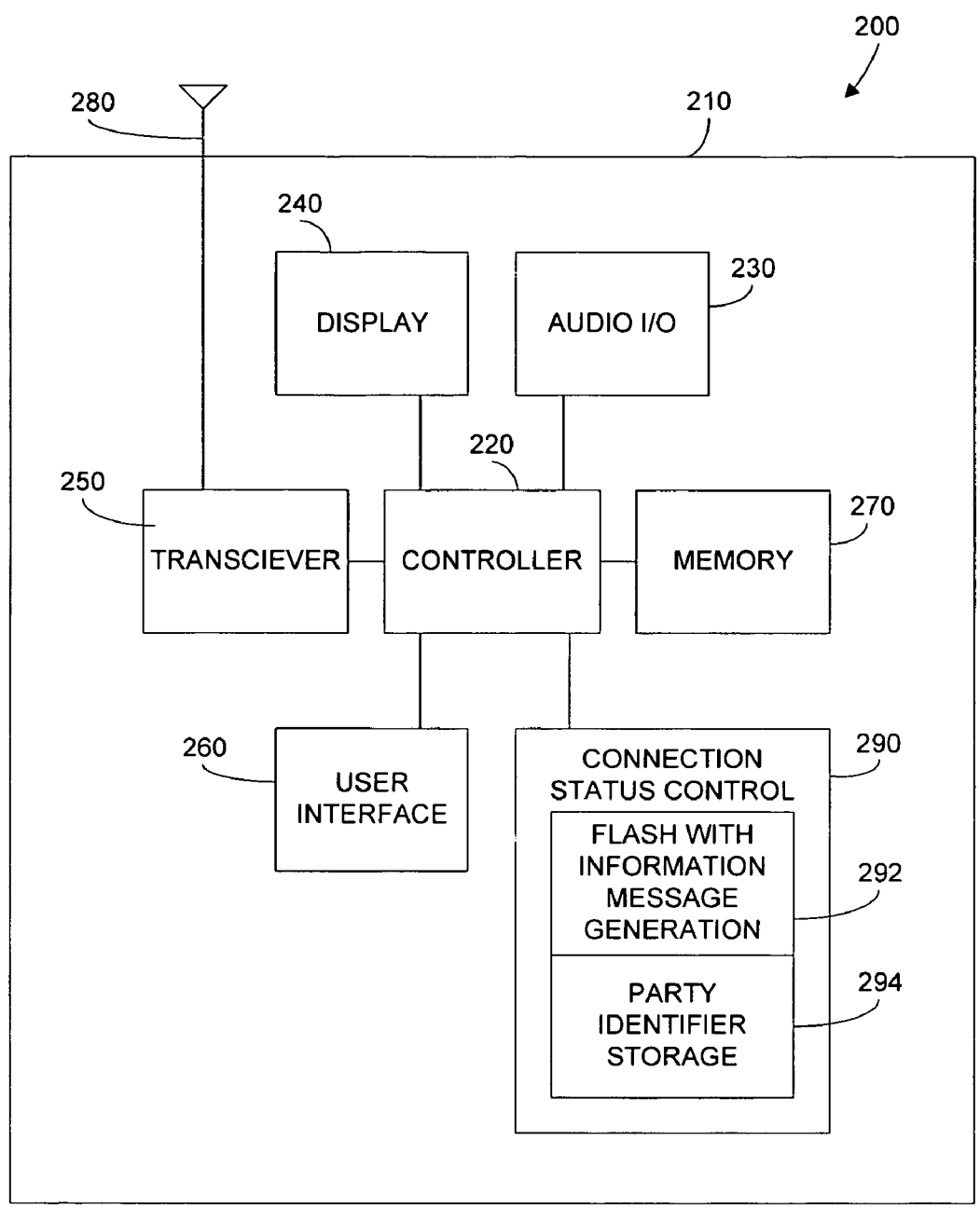
FIG. 2 is an exemplary block diagram of a communication device according to an example embodiment.

FIG. 2 is an exemplary block diagram of a communication device 200, such as the communication device 130, according to an example embodiment. The communication device 200 can be used for code division multiple access wireless communications. The communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the controller 220, an antenna 280 coupled to the housing 210 and the transceiver 250, and a connection status control module 290 coupled to the controller 220. The connection status control module 290 can include a flash with information message generation module 292 and a party identifier storage module 294. The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a mobile communication device.

In operation, the controller 220 can control the operation of the communication device 200. For example, the controller 220 can be configured to establish a connection with a first party, such as the communication device 140, via the transceiver 250. The party identifier storage module 294 can be configured to store a party identifier associated with the first party. The flash with information message generation module 292 can be configured to generate a flash with information message including a connection control information record that controls a connection status of the connected first party 140. The connection status can include a party audio mute status, a party hold status, a party active status, a party disconnect status, and/or any other useful connection status. The connection control information record can include a multi-party connection control information record. The connection control information record can also include a connection reference field having a unique identifier assigned to the first party 140 to indicate the first party 140 is the desired party for connection status operations. The controller 220 can then transmit the flash with information message on a reverse link signaling channel 170 via the transceiver 250.

The controller 220 can be further configured to establish a connection with a second party, such as the communication device 150, via the transceiver 250 while maintaining the connection with the first party, such as the communication device 140. The controller 220 can also be configured to transmit the flash with information message by transmitting the flash with information message on the reverse link signaling channel 170 to place the second party 150 on hold while activating a status of the first party 140 for call waiting. The flash with information message can include a number of multi-party connection records field indicating the number of pairs of connection reference and connection status fields included in the flash with information message.

The flash with information message can include a first connection reference field having a first unique value assigned to the first party 140 and a connection status field that indicates a desire to activate the connection status of the first party 140. Thus, the first party 140 can be released from a hold status by using the flash with information message. The flash with information message can also include a second connection reference field having a second unique value assigned to the second party 150 and a connection status field that indicates a desire to place the second party 150 into a hold status. Thus, the flash with information message can be used to switch between parties while using a call waiting function.

The controller 220 can additionally be configured to transmit the flash with information message by transmitting the flash with information message on the reverse link signaling channel 170 to activate a status of the first party 140 while maintaining an active status of the second party 150. Thus, the flash with information message can be used for a three-way calling function. The flash with information message can further be used to add more than three parties to a conference call-type communication.

The display 240 can indicate a connection status of connected parties. For example, the display 240 can display identifiers for each connected party. These identifiers may include a connected party's phone number, a related phone book entry, other caller identification information, or any other useful identifier that indicates the identity of a connected party. The display 240 can also display an indicator that indicates the status of each connected party. For example, an indicator may be displayed corresponding to each identifier for each connected party. The indicator may indicate an active status, a hold status, or any other useful indication of a status of a connected party.

Figure 3:
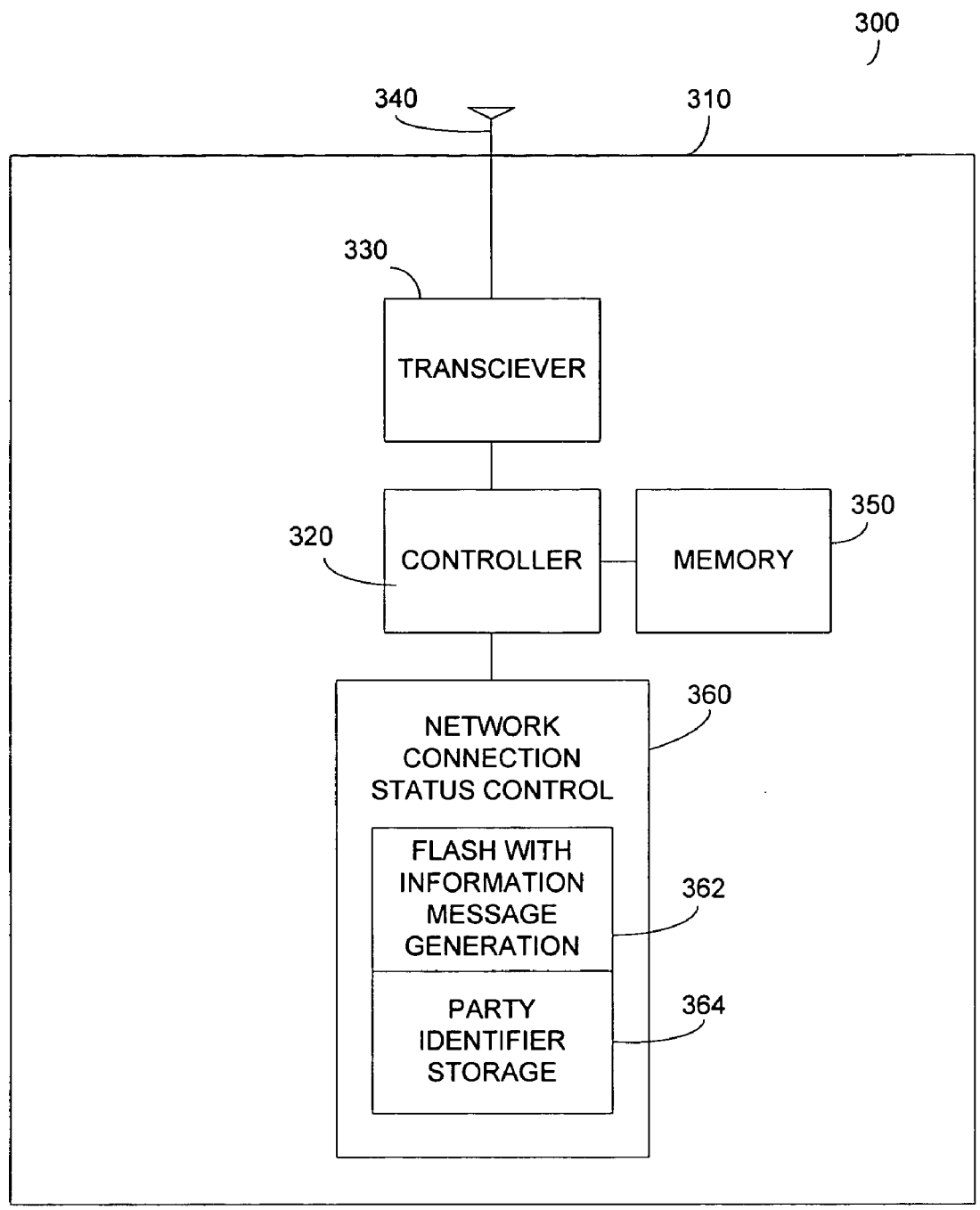
FIG. 3 is an exemplary block diagram of a network controller according to an example embodiment.

FIG. 3 is an exemplary block diagram of a network controller 300, such as the network controller 120, according to an example embodiment. The network controller 300 can include a housing 310, a controller 320 coupled to the housing 310, a transceiver 330 coupled to the housing 310, an antenna 340 coupled to the housing 310 and the transceiver 330, a memory 350 coupled to the controller 320, and a network connection status control module 360 coupled to the controller 320. The network connection status control module 360 can include a flash with information message generation module 362 and a party identifier storage module 364. The network connection status control module 360 can reside within the controller 320, within the memory 350, autonomously, or anywhere else on the network controller 300. The transceiver 330 and the antenna 340 may not be necessary if the network controller 300 is not located at a base station. The transceiver 330 may include a transmitter and/or a receiver. The memory 350 may include a random access memory, a read only memory, an optical memory, a subscriber identity module memory, or any other memory that can be coupled to a mobile communication device.

In operation, the controller 320 can control the operation of the network controller 300. For example, the controller 320 can be configured to establish a connection between a wireless communication device, such as the communication device 130, and a first party, such as the communication device 140. The party identifier storage 364 can include a unique value assigned to the first party 140. For example, the network connection status control module 360 can generate and/or assign the unique value assigned to the first party 140 and store the value in the party identifier storage 364. The flash with information generation module 362 can be configured to generate a flash with information message for transmission on a forward link signaling channel 175, the flash with information message including a connection control information record that indicates the connection status of the first party 140. The connection control information record can include a connection reference field including the unique value assigned to the first party 140 and a connection status field indicating the connection status of the first party 140. The controller 320 can also be configured to recognize a request for a connection with a second party, such as the communication device 150, while continuing the connection between the communication device 130 and first party 140. The network connection status control module 360 can be configured to assign a unique connection reference value to the second party 150 and store the value in the party identifier storage 364. Thus, the network controller 300 can be used to control operations of, and send information with respect to, operations in the system 100 for multi-party calling, call waiting, call hold, and other related operations.

Figure 4:
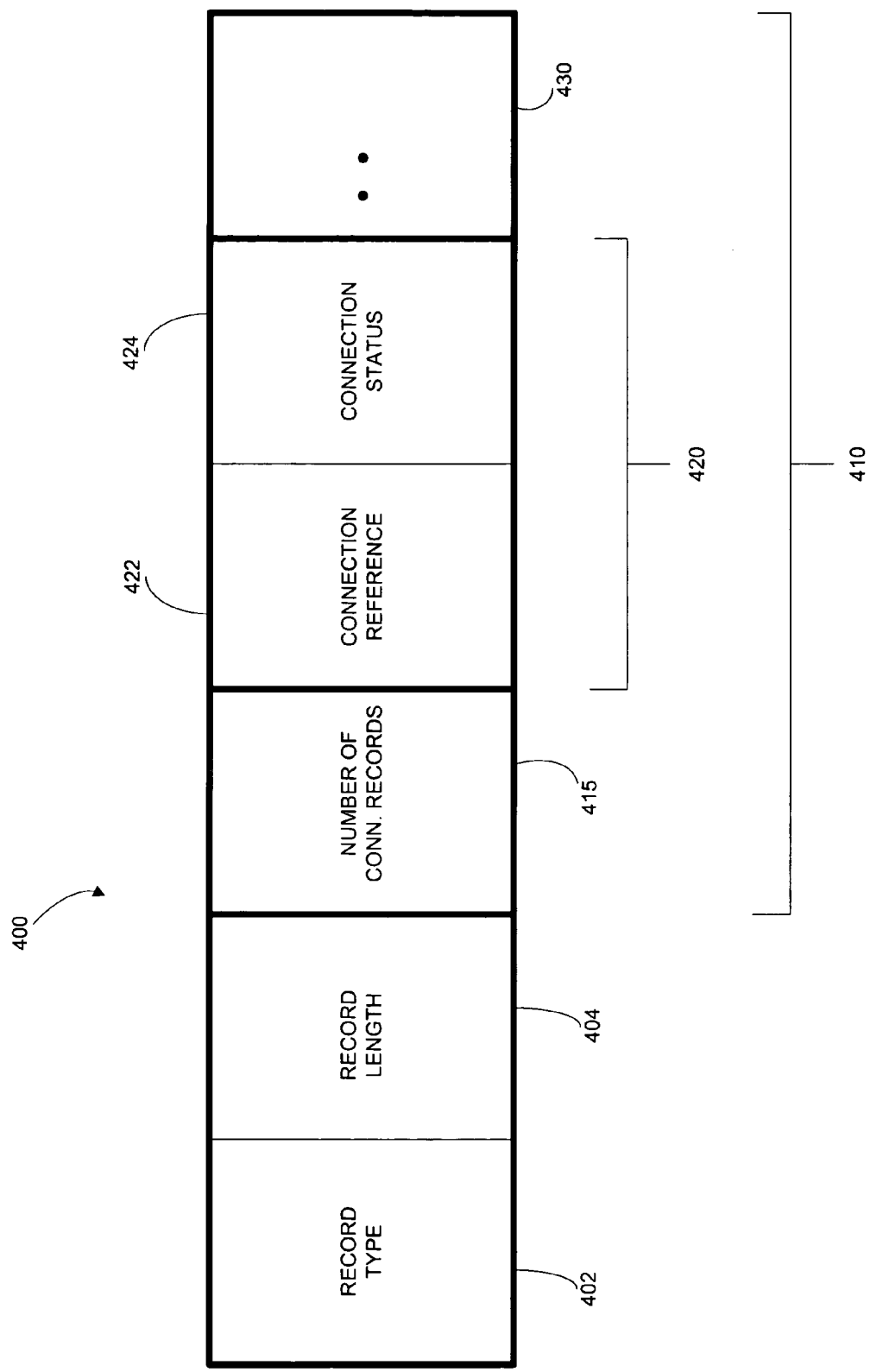
FIG. 4 is an exemplary illustration of a flash with information message according to an example embodiment.

FIG. 4 is an exemplary illustration of a flash with information message 400, such as a flash with information message or an extended flash with information message, according to an example embodiment. The flash with information message 400 may include multiple information records, each having a record type and a record length indicated in a record type field 402 and a record length field 404. For example, the flash with information message 400 may include a keypad facility information record, a called party number information record, a connected number information record, a called party subaddress information record, a calling party subaddress information record, a connected subaddress information record, an extended keypad facility information record, and/or a connection control information record 410. The connection control information record 410 can allow a communication device user to control the connection status of called and calling parties in, for example, a multi-party call between the communication device and other parties. The connection control information record 410 can include a number of connection records field 415, at least one connection record 420, and possibly other connection records 430. The total number of connection records can be indicated in a multi-party connection records field, such as the number of connection records field 415 included in the connection control information record 410. The connection record 420 can include a connection reference field 422 and a connection status field 424. The connection reference field 422 can include a unique value assigned to a specific communication path, communication device, or party in a communication connection. For example, a communication device 130 may establish a connection with a first party 140. This party 140 may be assigned a unique value. If the communication device 130 establishes a connection with a second party 150, the second party 150 may be assigned another unique value. For example, the first party 140 may be assigned a value of "000." Each subsequent party added to the communication can be assigned a next sequential value, such as "001," and "010." This unique value may be 2 bits, 3 bits, 4 bits, 5 bits, or any other useful number of bits in length. The connection status field 424 can indicate a current or desired status for the party identified in the connection reference field 422. For example, the connection status field 424 can indicate a mute and hold status that places the party referenced in the connection reference field 422 in a hold status and mutes the party from a conversation. The connection status field 424 can also indicate an active status that places the referenced party into an active status to take part in a conversation. The connection status field 424 can further indicate a disconnect status that can disconnect the referenced party from a multi-party call. The connection status field 424 can additionally indicate other useful connection statuses. For example, a flash with information message 400 can be sent by a base station 160, a network controller 120, or a communication device 200 while the communication device 200 is in a call to provide the communication device 200, the base station 160, or the network controller 120 with call status, call control, and/or utility information.

Figure 5:
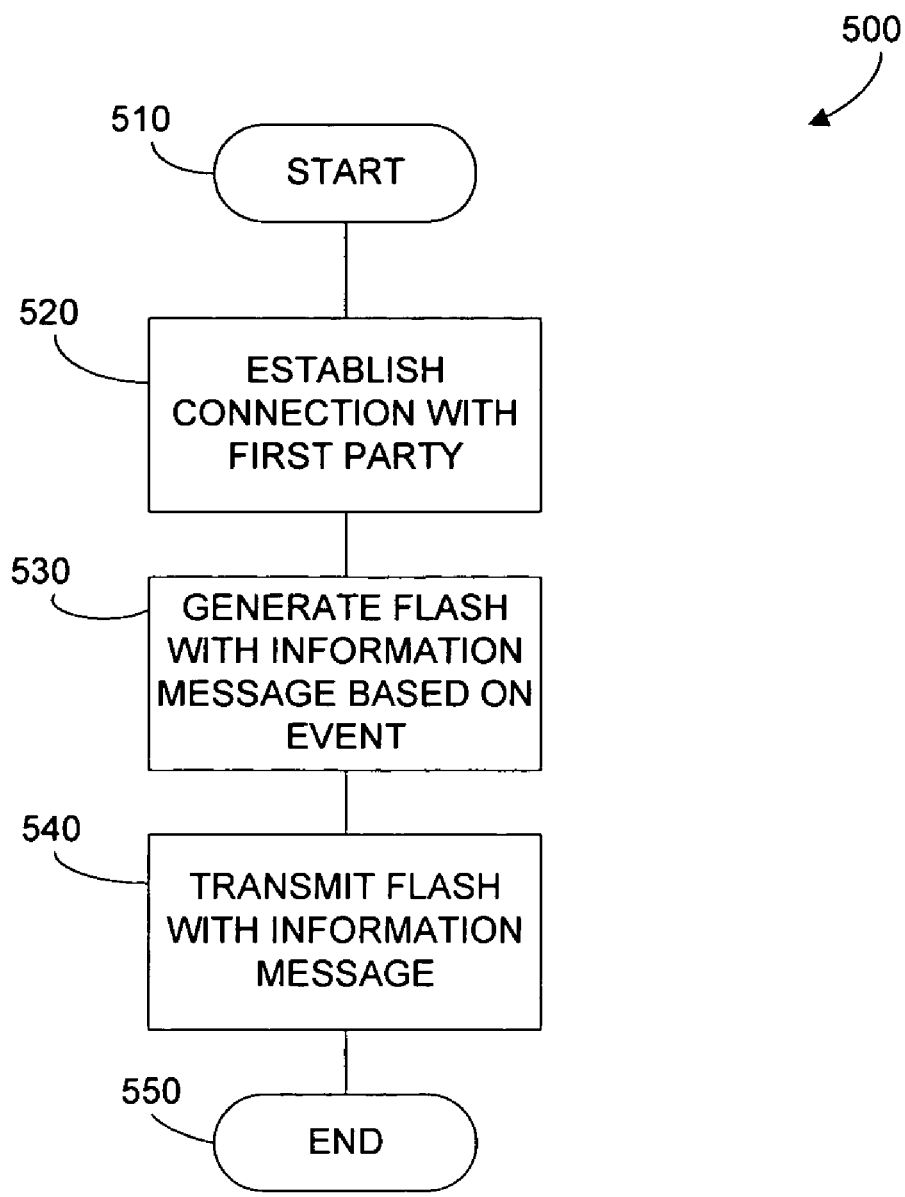
FIG. 5 is an exemplary flowchart outlining the operation of a communication device according to another embodiment.

FIG. 5 is an exemplary flowchart 500 illustrating the operation of the communication device 200 according to another embodiment. In step 510, the flowchart 500 begins. In step 520, the communication device 200 can establish a connection with a first party, such as the communication device 140. The communication device 200 may also establish a connection with a second party, such as the communication device 150, while maintaining the connection with the first party 140.

In step 530, the communication device 200 can generate a flash with information message 400 based on an event. For example, the communication device 200 can receive an input from a user on the user interface 220. The communication device 200 can determine from the input that the user desires to add another party to a communication, change a connection status of a connected party, or perform another like operation. The communication device 200 can then generate a flash with information message 400 based on the desired operation. The flash with information message 400 can include a connection control information record 410 that controls a connection status of the connected first party 140. The connection control information record 410 can include a connection reference field 422 having a unique identifier or a unique value assigned to the first party 140. The connection control information record 410 can also include a connection status field 424 corresponding to the connection reference field 422. The connection status field 424 can indicate a desire to activate the connection status of the party identified in the connection reference field 422.

The flash with information message 400 can also include a number of multi-party connection records field 415 indicating the number of connection records 420. For example, the number of connection records 415 can be the number of pairs of connection reference fields 422 and connection status fields 424 included in the flash with information message 400. The flash with information message 400 can further include a first connection reference field 422 having a first unique value assigned to the first party 140, a first connection status field 424 associated with the first connection reference field 422, the first connection status field 424 indicating a desire to activate the connection status of the first party 140. The flash with information message 400 can additionally include a second connection record 430 including a second connection reference field having a second unique value assigned to the second party 150, and a second connection status field associated with the second connection reference field, the second connection status field indicating a desire to place the second party 150 into a hold status.

In step 540, the communication device 200 can transmit the flash with information message 400 on a reverse link signaling channel 170. The communication device 200 can transmit the flash with information message 400 on the reverse link signaling channel 170 to place the second party 150 on hold while activating a status of the first party 140. For example, the communication device 200 can transmit the flash with information message 400 on a reverse link signaling channel 170 to activate a status of the first party 140 while maintaining an active status of the second party 150. In step 550, the flowchart 500 ends.

Figure 6:
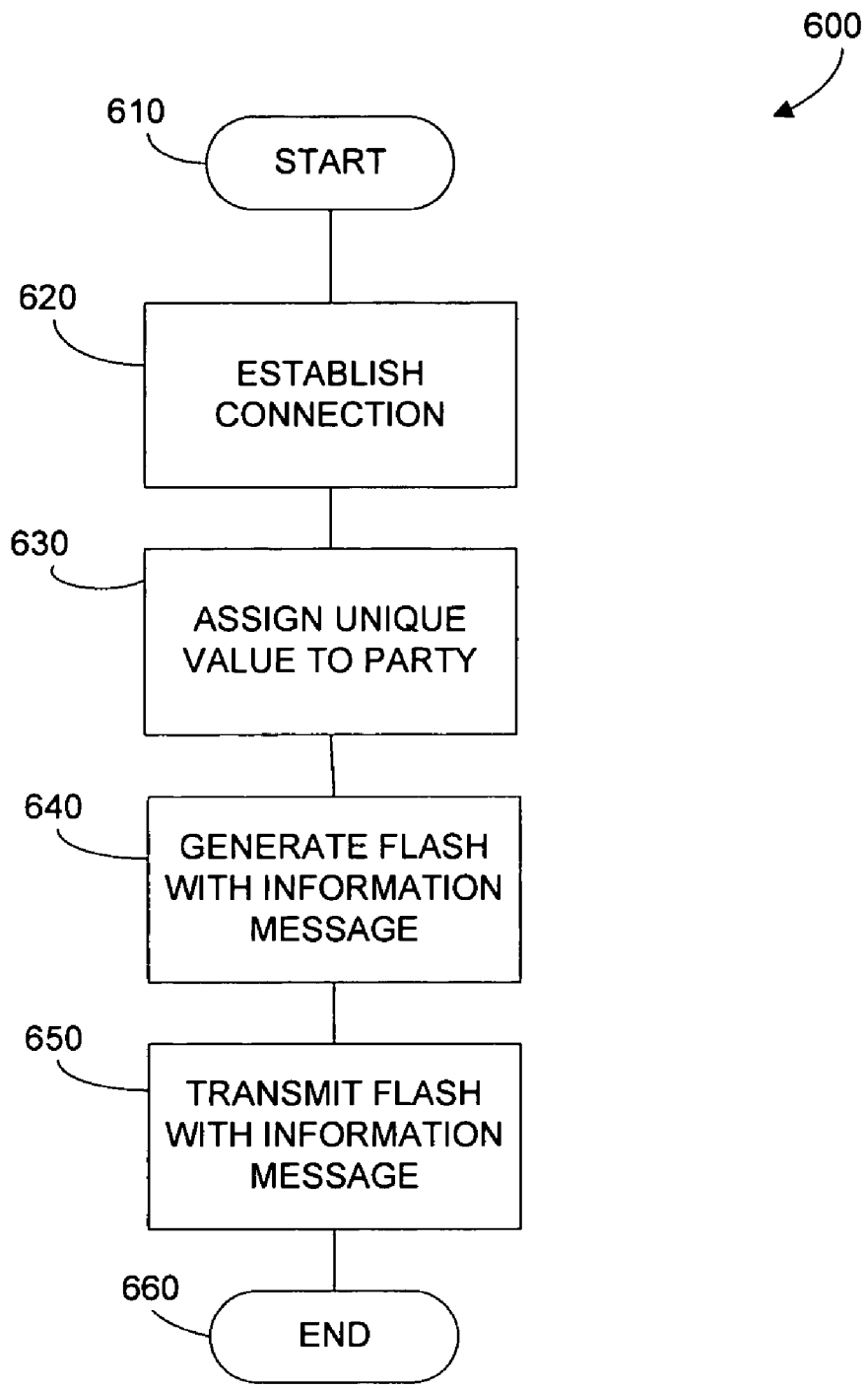
FIG. 6 is an exemplary flowchart outlining the operation of a network controller according to another embodiment.

FIG. 6 is an exemplary flowchart 600 illustrating the operation of the network controller 300 according to another embodiment. In step 610, the flowchart 600 begins. In step 620, the network controller 300 can establish a connection between a wireless communication device, such as the communication device 130, and a first party, such as the communication device 140. The network controller 300 can also recognize a request for a connection with a second party, such as the communication device 150, while continuing the connection between the wireless communication device 200 and first party 140. In step 630, the network controller 300 can assign a unique value, such as a connection reference value, to the first party 140. The network controller 300 can also assign a unique value, such as a unique connection reference value, to the second party 150 if a connection exists or is being made between the communication device 130 and the second party 150.

In step 640, the network controller 300 can generate a flash with information message 400. The flash with information message 400 can include a connection control information record 410 that indicates the connection status of the first party 140. The connection control information record 410 can include a connection reference field 422 having the unique value assigned to the first party 140 and a connection status field 424 indicating the connection status of the first party 140. In step 650, the network controller 300 can transmit the flash with information message 400 on a forward link signaling channel 175. In step 660, the flowchart 600 ends.

The method of this invention is preferably implemented on a programmed processor. However, the disclosed controllers, modules, and the like may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the invention by simply employing the elements of the independent claims. Accordingly, the preferred embodiments of the invention as set forth herein are intended to be illustrative, not limiting. Various changes may be made without departing from the spirit and scope of the invention.

What is claimed is:

1. A method in a code division multiple access wireless communication device, comprising:
   establishing a connection with a first party; and
   transmitting a flash with information message on a reverse link signaling channel, the flash with information message including a connection control information record that controls a connection status of the connected first party.

2. The method according to claim 1, wherein the connection control information record comprises a multi-party connection control information record.

3. The method according to claim 1, wherein the connection status includes one of a party audio mute status, a party hold status, a party active status, and a party disconnect status.

4. The method according to claim 1, wherein the connection control information record includes a connection reference field having a unique identifier assigned to the first party.

5. The method according to claim 1, wherein the flash with information message includes
   a connection reference field having a unique value assigned to the first party, and
   a connection status field that indicates a desire to activate the connection status of the first party.

6. The method according to claim 1, further comprising establishing a connection with a second party while maintaining the connection with the first party.

7. The method according to claim 6, wherein transmitting the flash with information message further comprises transmitting the flash with information message on the reverse link signaling channel to place the second party on hold while activating a status of the first party.

8. The method according to claim 7, wherein the flash with information message includes
   a number of multi-party connection records field indicating the number of pairs of connection reference and connection status fields included in the flash with information message,
   a first connection reference field having a first unique value assigned to the first party,
   a first connection status field associated with the first connection reference field, the first connection status field indicating a desire to activate the connection status of the first party,
   a second connection reference field having a second unique value assigned to the second party, and
   a second connection status field associated with the second connection reference field, the second connection status field indicating a desire to place the second party into a hold status.

9. The method according to claim 6, wherein transmitting the flash with information message further comprises transmitting the flash with information message on a reverse link signaling channel to activate a status of the first party while maintaining an active status of the second party.

10. The method according to claim 1, wherein the reverse link signaling channel comprises a reverse dedicated signaling channel.

11. The method according to claim 1, wherein the reverse dedicated signaling channel comprises a communication path that exists between a specific mobile station and a base station for the exchange of control information from the specific mobile station to the base station.

12. The method according to claim 1, wherein the flash with information message comprises an extended flash with information message.

13. A method in a code division multiple access system, comprising:
   establishing a connection between a wireless communication device and a first party; and
   transmitting a flash with information message on a forward link signaling channel, the flash with information message including a connection control information record that indicates the connection status of the first party.

14. The method according to claim 13, wherein the connection control information record includes a connection reference field having a unique value assigned to the first party and a connection status field indicating the connection status of the first party.

15. The method according to claim 13, wherein the connection status includes one of a party audio mute status, a party hold status, a party active status, and a party disconnect status.

16. The method according to claim 13, further comprising assigning the unique value assigned to the first party.

17. The method according to claim 13, further comprising:
   recognizing a request for a connection with a second party while continuing the connection between the wireless communication device and first party; and
   assigning a unique connection reference value to the second party.

18. A wireless communication device for code division multiple access wireless communication, the wireless communication device comprising:
   a transceiver;
   a controller coupled to the transceiver, the controller configured to establish a connection with a first party via the transceiver; and
   a connection status control module including
      a party identifier storage module configured to store a party identifier associated with the first party; and
      a flash with information message generation module configured to generate a flash with information message including a connection control information record that controls a connection status of the connected first party,
   wherein the controller is further configured to transmit flash with information message on a reverse link signaling channel via the transceiver.

19. The wireless communication device according to claim 18, wherein the connection control information record comprises a multi-party connection control information record.

20. The wireless communication device according to claim 18, wherein the connection status includes one of a party audio mute status, a party hold status, a party active status, and a party disconnect status.

21. The wireless communication device according to claim 18, wherein the connection control information record includes a connection reference field having a unique identifier assigned to the first party.

22. The wireless communication device according to claim 18, wherein the flash with information message includes
a connection reference field having a unique value assigned to the first party, and
a connection status field that indicates a desire to activate the connection status of the first party.

23. The wireless communication device according to claim 18, wherein the controller is further configured to establish a connection with a second party via the transceiver while maintaining the connection with the first party.

24. The method according to claim 23, wherein transmitting the flash with information message further comprises transmitting the flash with information message on the reverse link signaling channel to place the second party on hold while activating a status of the first party.

25. The wireless communication device according to claim 24, wherein the flash with information message includes
a number of multi-party connection records field indicating the number of pairs of connection reference and connection status fields included in the flash with information message,
a first connection reference field having a first unique value assigned to the first party,
a first connection status field associated with the first connection reference field, the first connection status field indicating a desire to activate the connection status of the first party,
a second connection reference field having a second unique value assigned to the second party, and
a second connection status field associated with the second connection reference field, the second connection status field indicating a desire to place the second party into a hold status.

26. The wireless communication device according to claim 23, wherein the controller is further configured to transmit the flash with information message by transmitting the flash with information message on a reverse link signaling channel to activate a status of the first party while maintaining an active status of the second party.

27. The wireless communication device according to claim 18, wherein the reverse link signaling channel comprises a reverse dedicated signaling channel.

28. The wireless communication device according to claim 18, wherein the reverse dedicated signaling channel comprises a communication path that exists between a specific communication device and a base station for the exchange of control information from the specific communication device to the base station.

29. The wireless communication device according to claim 18, wherein the flash with information message comprises extended flash with information message.

30. An apparatus for code division multiple access communication, the apparatus comprising:
a controller configured to establish a connection between a wireless communication device and a first party; and
a network connection status control module coupled to the controller, the network connection status control module including
a party identifier storage, the party identifier storage including a unique value assigned to the first party, and
a flash with information generation module configured to generate a flash with information message for transmission on a forward link signaling channel, the flash with information message including a connection control information record that indicates the connection status of the first party.

31. The apparatus according to claim 30, wherein the connection control information record includes a connection reference field including the unique value assigned to the first party and a connection status field indicating the connection status of the first party.

32. The apparatus according to claim 30, wherein the connection status includes one of a party-audio mute status, a party hold status, a party active status, and a party disconnect status.

33. The apparatus according to claim 30, wherein the network connection status control module is further configure to assign the unique value assigned to the first party.

34. The apparatus according to claim 30,
wherein the controller is further configured to recognize a request for a connection with a second party while continuing the connection between the wireless communication device and first party; and
wherein the network connection status control module is further configured to assign a unique connection reference value to the second party.

35. A method in a communication device, comprising:
establishing a connection with another communication device;
transmitting a flash with information message on a reverse traffic channel, the flash with information message including
a record type field indicating a party connection control record type,
a connection reference field that includes a identifier that identifies the another communication device, and
a connection control information field that indicates a desired connection status of the another communication device; and
displaying a connection status of the another communication device.

36. The method according to claim 35, further comprising:
establishing a connection with a third communication device while maintaining a connection with the another communication device; and
displaying the connection status of the third communication device.

* * * * *